US007710249B2

(12) United States Patent
Park

(10) Patent No.: US 7,710,249 B2
(45) Date of Patent: May 4, 2010

(54) METHOD OF CONTROLLING A DRIVER ASSISTANCE SYSTEM AND AN ASSOCIATED APPARATUS

(75) Inventor: Su-Birm Park, Aldenhoven (DE)

(73) Assignee: Delphi Technologies, Inc., Troy, MI (US)

( * ) Notice: Subject to any disclaimer, the term of this patent is extended or adjusted under 35 U.S.C. 154(b) by 163 days.

(21) Appl. No.: 11/496,803

(22) Filed: Aug. 1, 2006

(65) Prior Publication Data

US 2007/0030157 A1 Feb. 8, 2007

(30) Foreign Application Priority Data

Aug. 2, 2005 (EP) ................................. 05016799

(51) Int. Cl.
*B60Q 1/00* (2006.01)

(52) U.S. Cl. ....................... 340/438; 340/901; 340/571; 340/573.1

(58) Field of Classification Search ................. 340/438, 340/576, 573.1, 540, 436, 425.5, 435, 901–903, 340/575; 701/301, 36, 41, 70, 1
See application file for complete search history.

(56) References Cited

U.S. PATENT DOCUMENTS 5,432,509 A * 7/1995 Kajiwara .................... 340/903
6,014,595 A * 1/2000 Kobayashi ..................... 701/1
6,236,925 B1 * 5/2001 Gierling et al. ............... 701/53
6,957,591 B2 * 10/2005 Takafuji et al. ........ 73/862.391
7,177,743 B2 * 2/2007 Roy ........................... 701/36
7,424,364 B2 * 9/2008 Gern et al. .................. 701/301
2004/0193347 A1 * 9/2004 Harumoto et al. ............. 701/45
2004/0209594 A1 * 10/2004 Naboulsi ................. 455/404.1
2004/0246114 A1 * 12/2004 Hahn ......................... 340/435
2005/0273264 A1 * 12/2005 Gern et al. .................. 701/301
2006/0163943 A1 * 7/2006 Von Holt et al. ............ 303/177
2007/0182529 A1 * 8/2007 Dobler et al. ............... 340/438

FOREIGN PATENT DOCUMENTS

DE 10163967 A1 3/2003
JP 410080405 * 3/1998

* cited by examiner

*Primary Examiner*—Daniel Previl
(74) *Attorney, Agent, or Firm*—Jimmy L. Funke

(57) ABSTRACT

The present invention relates to a method of controlling a driver assistance system which can identify a danger situation with reference to a comparison of measured data with predetermined limit values and which can output a warning signal when it has identified a danger situation of this type. An additional control module is provided which determines an activity state of the driver in dependence on at least one input value which permits a conclusion on actions carried out by a driver and can suppress the outputting of the warning signal in dependence on this activity state.

10 Claims, 2 Drawing Sheets

METHOD OF CONTROLLING A DRIVER ASSISTANCE SYSTEM AND AN ASSOCIATED APPARATUS

TECHNICAL FIELD

The present invention relates to a method of controlling a driver assistance system which can identify a danger situation with reference to a comparison of measured data with predetermined limit values and which can output a warning signal when it has identified a danger situation of this type.

The present invention also relates to an apparatus for carrying out a method of this type which includes a driver assistance system with a signal output device and an additional control module connected to the driver assistance system.

BACKGROUND OF THE INVENTION

Driver assistance systems and associated control methods and apparatus for the carrying out of methods of this type are known from the prior art. Driver assistance systems exist, for example, which measure the distance to a preceding vehicle or to an obstacle and compare this distance with a stored minimum distance. If the stored minimum distance is fallen below, a warning signal is output by the driver assistance system. So-called "lane departure warning" systems are likewise known which warn the driver if he unintentionally departs from the lane. Driver assistance systems of this type known from the prior art therefore identify a danger situation with reference to a comparison of specific measured values such as the distance to the preceding vehicle with limit values generally already stored ex works.

It is a disadvantage of these driver assistance systems that the pre-set limit values do not lead to a satisfactory result for every driver and for every style of driving. In particular, a warning signal is also output when the driver deliberately changes lane, drives closely to the vehicle traveling in front of him or proceeds in another way into a situation identified as a danger situation by the driver assistance system. In this case, a warning by the driver assistance system is not wanted by the driver and, contrary to the original intention, the output warning signal can even result in a dangerous incorrect reaction of the driver. In any case, many drivers feel irritated when a warning signal is output regularly even though they are driving with concentration and so there is no need for a warning from their point of view. The described insufficiencies of conventional driver assistance systems have the result that many drivers as a rule completely deactivate the driver assistance system. The driver assistance system can thereby naturally also no longer output a warning signal in a real danger situation.

SUMMARY OF THE INVENTION

It is therefore the object of the present invention to provide a method of controlling a driver assistance system of the initially named kind and an associated apparatus for the carrying out of a method of this type which are better able to distinguish critical danger situations from non-dangerous risk situations and which, where possible, only output a warning signal when it is really necessary.

This object is satisfied in accordance with the invention by a method in accordance with claim 1 and by an associated apparatus in accordance with claim 10.

In the method in accordance with the invention, an additional control module determines an activity state of the driver in dependence on at least one input value which permits a conclusion on actions carried out by a driver and can suppress the outputting of the warning signal in dependence on this activity state.

The apparatus in accordance with the invention includes, in addition to the driver assistance system with a signal output device, a control module which is connected to the driver assistance system and which includes an electronic unit for the determination of an activity state of the driver and which is in communication with the measuring devices provided in the vehicle.

The activity state determined by the method in accordance with the invention provides information on how active or inactive the driver is. Since the activity of the driver is generally an indicator for his attention, it can be better evaluated by an adequate taking account of the corresponding activity state whether a "real" danger situation is present. If, for example, the driver is driving straight ahead at a constant speed during a long, monotonous highway trip over a long period of time, it is recognized in the method in accordance with the invention that the activity state of the driver corresponds to such a low activity that it can be anticipated that the attention of the driver may wander. In this case, a warning signal from the driver assistance system is meaningful and the outputting of the warning signal is consequently not suppressed. If the driver is, in contrast, very active, for example changes lane frequently, indicates, overtakes, brakes and accelerates, the additional control module can find with reference to the input value, which permits a conclusion on such actions carried out by the driver, that the activity state of the driver corresponds to a high activity so that he is presumably driving with attention and concentration. The outputting of the warning signal would be unnecessary in this case with a high probability since the driver is evidently consciously moving into a "danger situation". The warning signal is suppressed by the method in accordance with the invention in such a case so that the driver is not irritated by a superfluous warning signal and so is also not tempted to deactivate the driver assistance system.

Advantageous further developments of the invention are described in the dependent claims and in the now following description as well as in the description of a preferred embodiment presented together with the enclosed Figures.

In accordance with a preferred embodiment of the invention, the control module determines a numeric parameter for the activity state of the driver on a discrete or continuous scale and suppresses the outputting of the warning signal if this parameter lies above a predetermined threshold value.

In the simplest case, a scale of this type can include only two values, for example 0 for an inactive state and 1 for an active state. If the parameter is larger than or equal to 1, i.e. if the control module identifies the activity state as "active", the outputting of the warning signal is suppressed. However, a more finely structured discrete or continuous scale is also feasible. The latter is in particular meaningful when the control module uses a plurality of input values for the determination of the numeric parameter. Different indicators for the activity state of the driver can thus be appropriately taken into account. If the parameter exceeds the threshold value, it is assumed that the driver is sufficiently active and is thus attentive enough not to need any warning signal. The threshold value with which the computed numeric parameter is compared can be pre-set ex works or can also be selected in dependence on the style of driving of a driver, as will be explained later.

In accordance with an advantageous further development of the invention, the control module determines a numeric parameter for the activity state on a discrete or continuous scale and suppresses, as described above, the output of the warning signal when this parameter exceeds a first threshold value. In addition, however, at least one further, second threshold value is provided which lies below the first threshold value. If the parameter exceeds this second threshold value, but lies below the first threshold value, the limit values with reference to which the driver assistance system identifies a danger situation is adapted. The limit values are adapted in this process such that the criteria with reference to which the driver assistance system classifies a situation as a danger situation become stricter. For example, with a distance warning system, the minimum distance from a preceding vehicle at which a warning signal is output when it is fallen below can be reduced. It is therefore so-to-say an intermediate state in which the driver is admittedly active, but possibly not attentive enough to react fast at high risk even without a corresponding warning signal. The driver assistance system is consequently not fully deactivated, but only warns of a danger situation later. Not only two, but also a larger number of threshold values can naturally be provided, with the limit values used by the driver assistance system then being adapted step-wise in dependence on the current parameter for the activity state.

In accordance with a further preferred embodiment of the invention, alternatively or additionally to the above-described procedure, different threshold values can also be provided for different types of danger situations. For example, the threshold value for the activity state above which a warning signal is suppressed or limit values used by the driver assistance system are adapted can differ depending on whether a warning signal is output because the distance to a preceding vehicle is too low, because an unbroken middle line is crossed or because the speed is not matched to the road conditions. The fact can thus be taken into account that certain types of danger situations can also be overlooked or intentionally ignored by a very active driver, whereas other danger situations are generally noticed by an active and attentive driver even without the help of the driver assistance system.

As already mentioned above, the threshold value or values can be fixed ex works. In a method of this type, only a comparatively low computation effort is required.

In accordance with a preferred embodiment of the invention, a rate of revolution of the vehicle and/or a steering angle in dependence on time serve as an input value for the control module. The rate of revolution provides information on how fast the vehicle rotates about a perpendicular central axis and is thus indirectly related to the steering activity of the driver. The steering angle provides direct information on the steering activity and can consequently be used as an input value for the control module instead of the rate of revolution. At high rates of revolution or at a constantly changing steering angle, an increased activity of the driver can be concluded, whereas a constant steering angle, in particular when the steering wheel is not turned, can allow a conclusion of a low activity and thus a possibly reduced attention of the driver.

In accordance with a further preferred embodiment of the invention, the control module uses a speed of the vehicle as the input value and computes an acceleration from the time development of the speed to determine the activity state of the driver. Whereas a speed remaining constant over a long period is an indicator for a low activity of the driver, high accelerations, both with a positive sign and with a negative sign, allow a conclusion of a high activity of the driver and thus an attentive driver. Since the speed of the vehicle is available as a measured value in every vehicle, a value is obtained from the computation of the acceleration from the speed which is a reliable indicator for the activity of the driver without an additional measurement having to be carried out.

In accordance with a further advantageous further development of the invention, an actuation of an indicator, of a brake and/or of a built-in electrical device by the driver serves as the input value for the control module. It is possible to determine with a comparatively low effort whether the indicator and/or the brake are just being actuated and both an actuation of the indicator and an actuation of the brake allow the conclusion that the driver is alert and concentrated. Vice versa, the attention of the driver is evidently not only directed to the driving of the vehicle if, for example, he is setting a radio station or is actuating a navigation system. An actuation of a built-in electrical device by the driver is thus an indicator for an activity state in which a warning signal should rather not be suppressed.

The previously listed possible input values can naturally be used individually or together in all feasible combinations. For instance, an acceleration can be calculated from the vehicle speed, for example, and it can additionally be monitored whether the driver is actuating an indicator. In this case, for example, a parameter computed by the control model for the activity state can be proportional to the computed acceleration, with a fixed value being added to the parameter on an actuation of the indicator detected within the last few minutes. The use of other additional input values is also feasible, with information preferably being used which is anyway available in the vehicle.

In accordance with a particularly preferred embodiment of the invention, the control module determines an average time value of a parameter for the activity state of the driver and computes a threshold value in dependence on this mean value, with a warning signal being suppressed when the parameter for the activity state exceeds this threshold value.

In this manner, the method in accordance with the invention can be adapted individually to the behavior of the driver. With a driver who generally has a very sporty style of driving, the mean time value of the parameter for the activity state will be higher than with a careful and leisurely driver. When the parameter for the activity state is close to or above the individual average value, it can, however, be assumed in both cases that the driver is so attentive that he does not need a warning signal or only needs a warning signal very late. A value can consequently be selected as the threshold value, for example, which is a specific fraction below the individual mean value of the parameter so that a warning signal is only suppressed when the driver has at least almost reached his average activity state. With a less spirited driver, the warning signals of the driver assistance system are thus already suppressed at a lower parameter for the activity state than with a sporty driver.

It is possible in this process to calculate and then to store an average time value of the parameter for the activity state for a specific driver over a specific time period in each case only once. If a device is used which identifies the driver on the starting of the vehicle, the threshold value associated with this driver can in each case be called up and used automatically.

A new average value of the parameter for the activity state of the driver can, however, also be determined on every new starting of the vehicle, with it then being stored after a specific period or even being updated at regular intervals during the trip. In this case, the current form of the driver and the actual traffic conditions can also be taken into account.

BRIEF DESCRIPTION OF THE DRAWINGS

In the following, the invention should be described purely by way of example with respect to a preferred embodiment and to the two enclosed Figures. The Figures show.

DESCRIPTION OF THE PREFERRED EMBODIMENT

Figure 1:
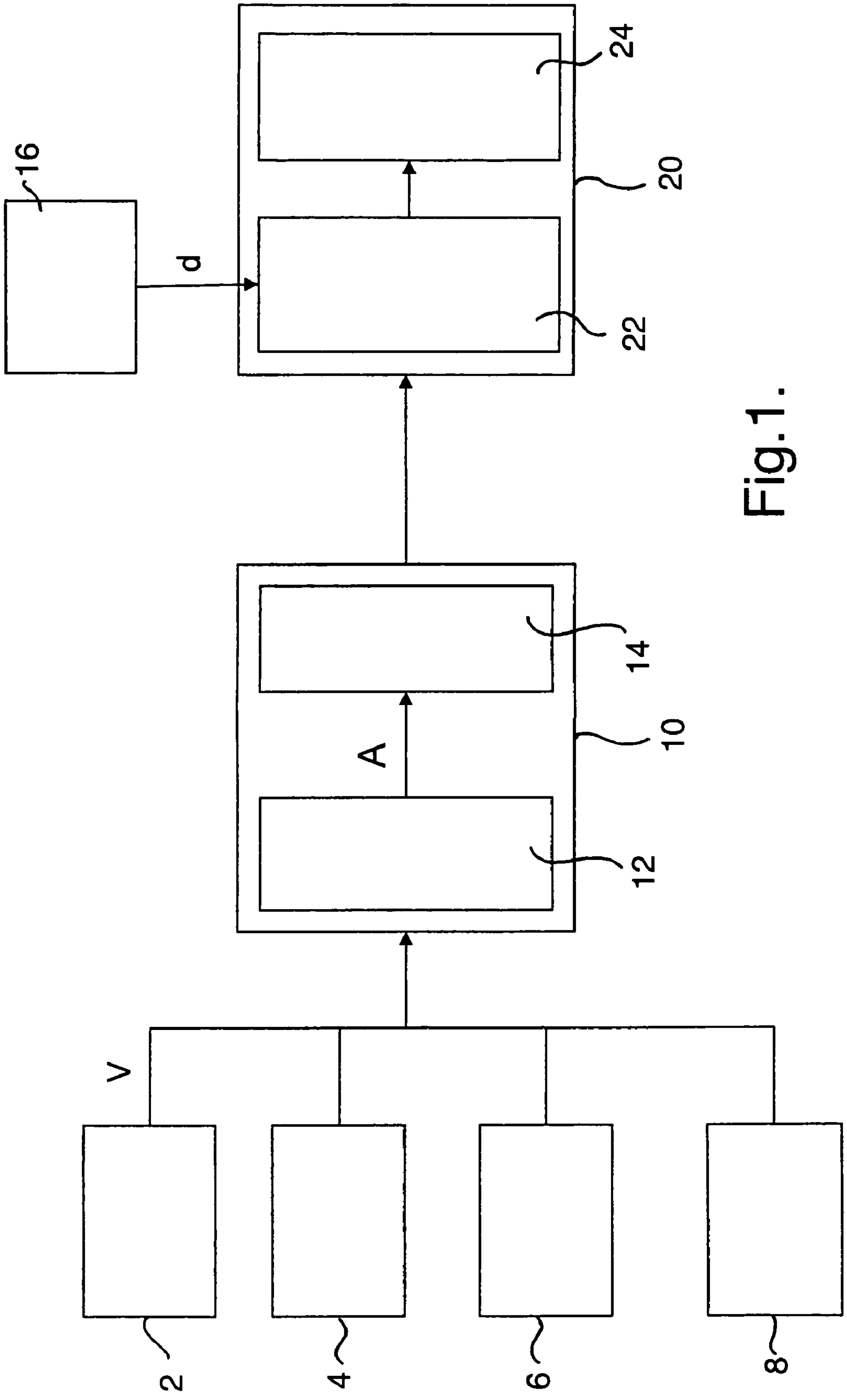
FIG. 1 is a schematic representation of an apparatus in accordance with the invention.

The apparatus in accordance with the invention, which is built into a motor vehicle, is shown schematically in FIG. 1 and includes a control module 10 and a driver assistance system 20. Different measuring devices 2, 4, 6, 8 belonging to the vehicle are shown schematically at the left in FIG. 1 and are connected to the control module 10 to transmit signals thereto. A speed v is forwarded to the control module from a speedometer 2 and a sensor 4 measures the pressure exerted onto a brake pedal or the pedal position of the brake pedal and forwards a corresponding measured value to the control module 10. A steering angle sensor 6 measures the angular position of the steering wheel and forwards it to the control module 10 as the input value. Finally, a sensor 8 monitors the actuation of the indicator and, when the indicator is actuated, forwards a corresponding input signal to the control module 10. In addition to the four input values listed, other input values can naturally also be used. Instead of the steering angle sensor 6, for example, a sensor can thus also be used which measures the rate of revolution of the vehicle.

Figure 2:
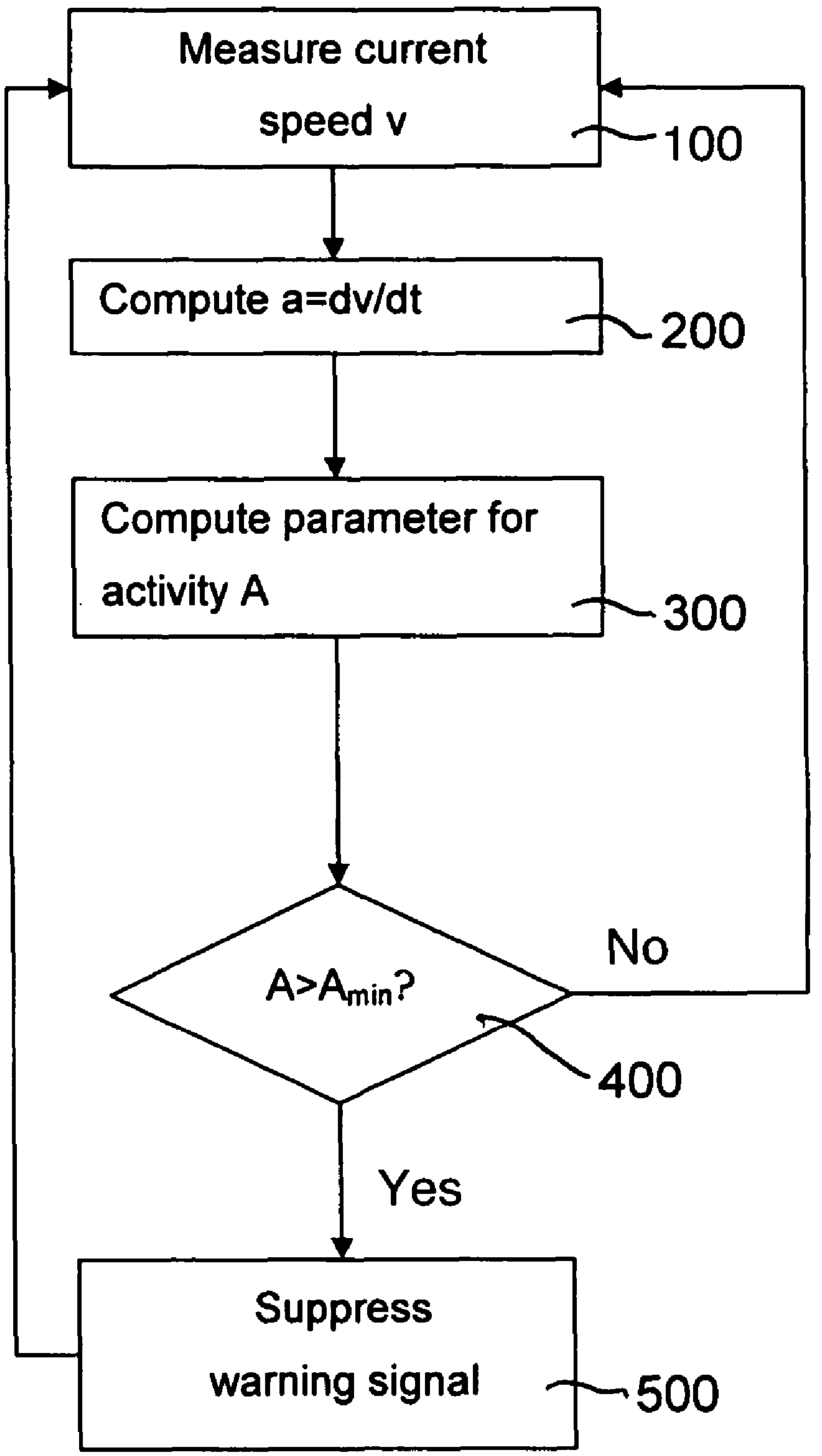
FIG. 2 is a flowchart illustrating the method in accordance with the invention.

In the flowchart shown in FIG. 2, a process is shown for reasons of simplicity in which the speed v of the vehicle, which is measured in a first step 100, is used as the only input value. Further input values can naturally also be processed within the framework of a process such as is shown in FIG. 2.

The driver assistance system 20 shown in FIG. 1 is a distance warning system which receives information on a distance d to a preceding vehicle from a radar 16. The measured distance d is constantly compared with a stored minimum distance $d_{min}$ in an electronic unit 22 within the driver assistance system 20. If d falls below the minimum distance $d_{min}$, a warning signal is normally output by a signal output device 24 which is likewise part of the driver assistance system 20.

The control module 10 shown in FIG. 1 includes an electronic unit 12 in which a parameter A for an activity state of the driver is computed. The computation of the parameter for the activity state A is shown in step 300 in the flowchart of FIG. 2. As can be seen in FIG. 2, the actual computation of the parameter A in step 300 is preceded by a computation of an acceleration "a" from the time development of the measured speed v (step 200 in FIG. 2). This computation is likewise carried out by the electronic unit 12.

The computed parameter A for the activity state, which is proportional to the acceleration "a" of the vehicle computed in step 200 in the simplest case shown in FIG. 2, is forwarded by the electronic unit 12 to a comparator module 14 which is likewise part of the control module 10 (cf. FIG. 1).

In the comparator module 14, the computed parameter A for the activity state of the driver is compared with a threshold value $A_{min}$ (cf. step 400 in FIG. 2).

If the actual parameter A is larger than the threshold value $A_{min}$, the warning signal which the driver assistance system 20 normally outputs is suppressed (cf. step 500 in FIG. 2). For this purpose, either the total driver assistance system can be deactivated or only the signal output unit 24 can be deactivated. Alternatively, the outputting of the signal can also be suppressed electronically within the driver assistance system 20.

If it is found in the comparison of the parameter A with the threshold value $A_{min}$ (step 400 in FIG. 2) that the activity A is smaller than the threshold value $A_{min}$, the warning signal is not suppressed.

The process shown in FIG. 2 is in any case restarted again after the end of the described process steps, irrespectively of whether the warning signal was suppressed in a step 500 or not. It can either run continuously or restart at pre-selected time intervals.

Subsequent to process step 300, in which a parameter A for the activity state is determined, a further process step not shown in FIG. 2 can be provided in which an average time value for the parameter A is computed from the parameter A computed in step 300. In a further step, an individual threshold value $A_{min}$ can then be computed from this average value, for example in that a fixed value is deducted from the average time value of the parameter A. This average value is then forwarded to the comparator module 14 in the control module 10.

A method is shown in FIG. 2 for reasons of simplicity in which the parameter A computed in step 300 is only compared with a single threshold value $A_{min}$. However, a plurality of different threshold values $A_{min}$, $A_{min2}$, etc. can also exist. In this case, a more complex comparison is carried out by the comparator module 14. If the parameter A lies above the largest threshold value $A_{min}$ , the warning signal is still suppressed. If, however, the computed parameter A is admittedly below the largest threshold value $A_{min}$, but above a smaller threshold value $A_{min2}$, the limit value which the driver assistance system 20 uses to identify a danger situation is adapted accordingly. In the embodiment shown in FIG. 1, the minimum distance $d_{min}$ would thus be reduced in this case.

The invention claimed is:

1. A method for controlling a driver-assistance system which can identify a dangerous situation using a comparison of measured data with preset limiting values and which emits a warning signal upon detecting such a dangerous situation, said method comprising the step of:

providing a control module operative to calculate a characteristic value (A) for activity of the driver as a function of at least one input value, which permits a conclusion on actions carried out by a driver, determines a temporal average value of said characteristic value (A) and calculated a threshold value (Amin) as a function of said average value, wherein a warning signal is suppressed when the characteristic value (A) for the activity exceeds the calculated threshold value (Amin).

2. The method of claim 1, wherein the control module determines a numeric parameter for the activity state on a discrete or continuous scale and, if this parameter lies above a predetermined threshold value, suppresses the outputting of the warning signal.

3. The method of claim 2, wherein different threshold values are provided for different types of danger situations.

4. The method of claim 2, the threshold value or values is/are fixed ex works.

5. The method of claim 1, wherein the control module determines a numeric parameter for the activity state and, if this parameter exceeds a first threshold value, the output of the warning signal is suppressed and, if the parameter exceeds a second threshold value, but lies beneath the first threshold value, the limit values with reference to which the driver assistance system identifies a danger situation are adapted.

6. The method of claim 1, wherein a rate of revolution of the vehicle and/or a steering angle serves and/or serve as input values for the control module in dependence on the time.

7. The method of claim 1, wherein the control module uses a speed of the vehicle as the input value and computes an acceleration from the time development of the speed in order to determine the activity state of the driver.

8. The method of claim 1, wherein an actuation of an indicator, of a brake and/or of a built-in electrical device by the driver serves and/or serve as the input value for the control module.

9. The method of claim 1, wherein the control module determines an average time value of a parameter for the activity state of the driver and computes a threshold value in dependence on this mean value, with a warning signal being suppressed when the parameter for the activity state exceeds this threshold value.

10. A vehicle device operative to reset warning system trigger threshold values as a function of the temporal activity state of the vehicle operator, said device comprising:

a plurality of measuring devices, including a vehicle speed sensor, each measuring device operative to sense a predetermined vehicle operational parameter and to generate an output signal as a function thereof;

a driver assistance system operative to monitor at least one of said parameter output signals, to compare monitored signal values with a related calculated threshold value, to generate a warning signal when said monitored signal value exceeds said related threshold value and to activate a signal output device in response to said warning signal;

a control module including an electronic control unit and a comparator operative to receive said measuring device output signals, to measure current vehicle speed, to compute vehicle acceleration, to compute a current vehicle operator activity state (A) as a function of vehicle acceleration, to calculate and store a vehicle operator activity state threshold value (Amin) as a function of previously computed vehicle operator activity states, to compare said current vehicle activity state with said threshold value, and to suppress said driver assistance system warning signal when said operator activity state exceeds said activity state threshold value.

* * * * *